United States Patent [19]
West

[11] 3,726,556
[45] Apr. 10, 1973

[54] SAFETY BUMPER FOR VEHICLES

[76] Inventor: William Holmes West, 4115 McGhee, Kansas City, Mo. 64111

[22] Filed: Apr. 7, 1971

[21] Appl. No.: 131,998

[52] U.S. Cl.....................................293/62, 293/48
[51] Int. Cl.................................................B60r 19/04
[58] Field of Search......................293/48, 49, 62, 63, 293/72, 75, 76, 77, 79, 98; 180/97

[56] References Cited

UNITED STATES PATENTS

| | | | |
|---|---|---|---|
| 2,354,700 | 8/1944 | Pezzano | 293/57 |
| 2,077,110 | 4/1937 | Johnson | 293/62 |
| 2,078,679 | 4/1937 | Golphin | 293/48 |
| 1,651,053 | 11/1927 | Clay | 293/98 X |
| 1,697,498 | 1/1929 | Fageol | 293/98 X |
| 2,984,512 | 5/1961 | Shaginaw | 293/73 |

FOREIGN PATENTS OR APPLICATIONS

| | | | |
|---|---|---|---|
| 869,825 | 6/1961 | Great Britain | 293/98 |

*Primary Examiner*—Gerald M. Forlenza
*Assistant Examiner*—Robert Saifer
*Attorney*—Bradley & Wharton

[57] ABSTRACT

A safety bumper for motor vehicles utilizes first and second barrier members disposed to present a cuneiform structure at both the front and rear of the vehicle. The structures are coupled with the frame of the vehicle and are strong enough to withstand considerable collision forces without damage to the vehicle. First and second side guards extend longitudinally of the vehicle on either side and cooperate with the cuneiform structures to present an uninterrupted barrier surface. At least one of the side guards is comprised of a plurality of guard sections, one of which is secured to the door of the vehicle to allow ingress and egress.

The protective bumper can be adapted for use on existing vehicles or the entire vehicle construction can be modified to accommodate the new bumper. In either case however, whenever the vehicle contacts an object having a velocity different from that of the vehicle, the forces of collision will be dissipated laterally of the vehicle and the object thereby minimizing absorption of the forces and the resultant collision damage. Relatively minor collisions are completely avoided by causing the two colliding objects to move laterally and continuing on their respective paths.

2 Claims, 8 Drawing Figures

PATENTED APR 10 1973 3,726,556
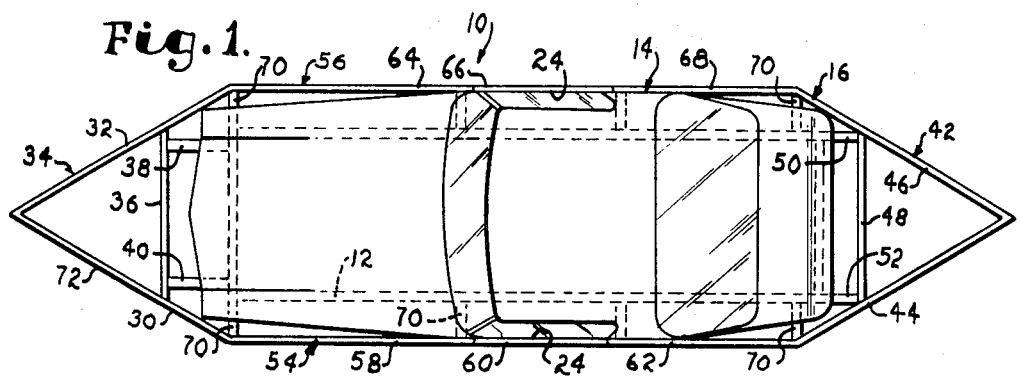
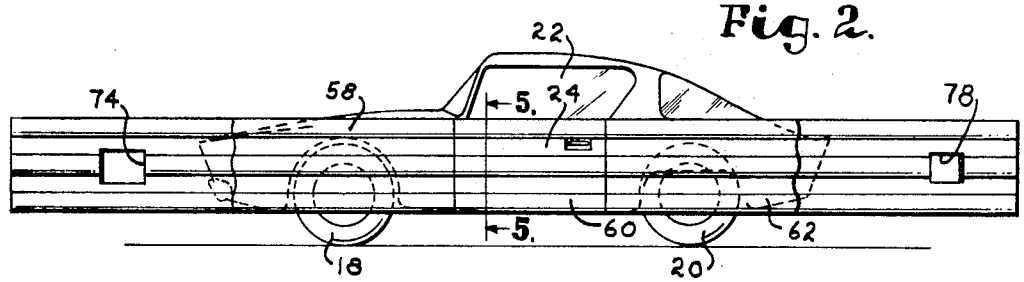
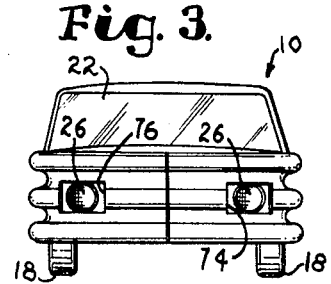
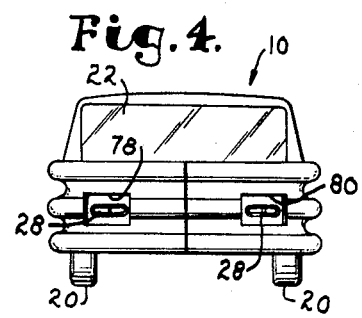
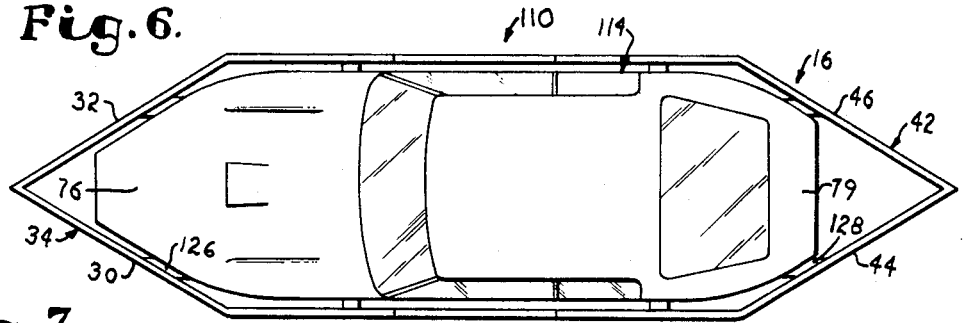
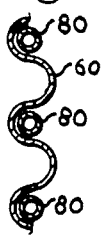
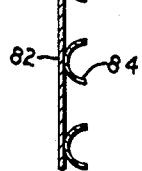
INVENTOR.
William Holmes West
BY Bradley and Wharton
ATTORNEYS.

SAFETY BUMPER FOR VEHICLES

This invention relates to the automobile industry and, more particularly, to a safety bumper for a motorized vehicle.

The need for functional vehicle bumpers has been greatly emphasized in recent years. It is well recognized by experts in the field, that an automobile bumper capable of withstanding collisions at up to 30 miles per hour without damage to the vehicle, could save thousands of lives and millions of dollars in property damage each year. While various proposals for safety bumpers have been made, none have proved both successful and practical enough to warrant the acceptance of the automobile manufacturers or the federal government.

It is therefore an object of the present invention to provide a vehicle safety bumper wherein a cuneiform structure is disposed at both the front and rear of the vehicle to provide a sloping barrier surface which will cause the forces of collision between the vehicle and an object with which it collides to be dissipated laterally rather than be absorbed by the vehicle.

As a corollary to the above object, it is an important aim of this invention to provide a vehicle safety bumper as described to avoid damage to the vehicle and injury to its occupants when the vehicle collides with another object.

It is also an aim of the present invention to reduce the number of vehicle accidents by providing a safety bumper which will cause two colliding vehicles to move away from each other without damage to either vehicle.

One of the objectives of my invention is also to provide a safety bumper for vehicles which will be beneficial in reducing the damage or injury caused when the vehicle strikes a stationary object such as a tree or light pole by providing a cuneiform structure at both the front and rear of the vehicle which will cause the vehicle to move laterally of the stationary object rather than striking the same "head on."

This invention also has an objective, a safety bumper for vehicles which includes cuneiform structures at both the front and rear of the vehicle, and guards disposed along the sides of the vehicle to provide a barrier for protecting the vehicle from collision with other objects, wherein the safety bumper can be constructed from presently available materials at a cost only slightly greater than the cost of existing vehicle bumpers.

In the drawing:

FIG. 1 is a top plan view of a collision-resistant vehicle construction utilizing the protective bumper of the present invention;

FIG. 2 is a side elevational view of the vehicle shown in FIG. 1;

FIG. 3 is a front elevational view of the vehicle shown in FIGS. 1 and 2;

FIG. 4 is a rear elevational view, similar to FIG. 3;

FIG. 5 is an enlarged vertical cross-sectional view taken along 5—5 of FIG. 2;

FIG. 6 is a top plan view of a modified vehicle construction employing the protective bumper of the invention;

FIG. 7 is a vertical cross-sectional view similar to FIG. 5 showing a modified form of construction for the barrier members and side guards of the bumper; and FIG. 8 is a vertical cross-sectional view similar to FIG. 7 showing another alternative construction for the barrier members and side guards.

Referring initially to FIG. 1, a vehicle of the automobile, passenger variety is designated generally by the numeral 10. The vehicle 10 is comprised of a rigid framework 12 of generally rectangular configuration to conform to the configuration of the vehicle, a body 14 mounted on the framework 12, and a safety bumper designated generally by the numeral 16. Additionally, from FIGS. 2–4, it is seen that the vehicle 10 includes a pair of front wheels 18 and a pair of rear wheels 20 which are coupled with the framework 12 by an appropriate axle assembly (not shown). The body 14 includes a passenger enclosing compartment 22 which is reached through a pair of doors 24 on either side of the vehicle 10. As is the standard practice in modern automobile construction, the vehicle 10 is provided with a pair of headlights 26 and a pair of taillights 28.

The protective safety bumper 16 completely surrounds the vehicle 10 as best illustrated in FIG. 1. The bumper 16 comprises first and second elongated generally planar barrier members 30 and 32 which are rigidly interconnected and disposed to present a cuneiform structure 34. A rigid cross brace 36 extends between the members 30 and 32 to prevent either of the members from collapsing in the direction of the other member. A pair of mounting brackets 38 and 40 at opposite ends of the brace 36 serve to mount the structure 34 on the framework 12 in fore-and-aft alignment with the vehicle 10.

A generally similar cuneiform structure 42 at the rear of the vehicle 10 is comprised of third and fourth rigidly interconnected, elongated, generally planar barrier members 44 and 46. A second cross brace 48 is disposed between the members 44 and 46 and is welded or otherwise coupled with a pair of brackets 50 and 52 for mounting the structure 42 on the framework 12.

Disposed between the forward cuneiform structure 34 and the rearward cuneiform structure 42 are a pair of elongated generally planar side guards 54 and 56. Each of the guards 54 and 56 is comprised of three guard sections 58, 60, 62 and 64, 66 and 68 respectively. The guard sections 58, 62, 64 and 68 are connected directly to the framework 12 by a plurality of mounting brackets 70. The sections 60 and 66, however, are coupled with the doors 24 of the vehicle 10 and are independent of the adjacent sections at either side to allow ingress and egress to and from the passenger compartment 22. Although the sections 60 and 66 are independent of the adjacent sections 58, 62, and 64, 68 respectively, it is important that the sections 60 and 66 be so disposed that when the doors 24 are in their closed positions, the sections 58, 60 and 62, 64, 66 and 68 each forms a substantially uninterrupted continuous planar surface.

It is also to be noted that the guard sections proximal the structures 34 and 42 are disposed in alignment with the ends of the members forming the structures so as to provide a continuous barrier surface 72 which completely surrounds the vehicle 10. This surface is uninterrupted except for openings 74, 76, 78 and 80 in each of the members 30, 32, 44 and 46 respectively which allow the passage of light from the headlights 26 and the taillights 28. The guards 54 and 56 as well as the members 30, 32, 44 and 46 preferably have a serpentine cross-sectional configuration, as illustrated in FIG. 5, to provide a corrugated effect which increases the strength of the safety bumper 16.

Because the apexes of the structures 34 and 42 are disposed facing away from the vehicle 10, any object which the vehicle 10 strikes when in motion, will most likely contact the sloping barrier surfaces of the structures 34 and 42. Manifestly, when the barrier surface of the vehicle comes into contact with an object having a velocity different from that of the vehicle, the forces of collision will be dissipated laterally and any absorption of forces is thereby minimized. Thus, should the vehicle 10 strike a stationary, immovable object such as a tree or light pole the vehicle will be moved laterally thereby avoiding a head-on collision with the object.

Similarly, should the vehicle 10 come into contact with another vehicle also having a protective safety bumper 16, the two vehicles will be moved laterally to avoid a direct collision as a result of the dissipation of the collision forces rather than absorption of the same by the vehicles. Where the vehicle 10 and the object with which it collides are not completely separated, but pass in sliding relationship one to the other, the guards 54 and 56 protect the car body 14 from any damage.

In FIG. 6, a modified form of vehicle construction is shown and designated generally by the numeral 110. A vehicle 110 has a body 114 which is also surrounded by a protective bumper 16. The body 114 is shaped at its front 76 and its rear 79 in a generally cuneiform configuration to conform to the configuration of the front and rear structures 34 and 42. Thus, the front 76 is received within the structure 34 and the rear 79 is received within the structure 42 to reduce the overall length of the vehicle 110. A pair of headlights 126 are constructed to be contiguous with the members 30 and 32 and a pair of taillights 128 are constructed to be contiguous with the members 44 and 46.

It is contemplated that the vehicle 110 would be produced by automobile manufacturers to take advantage of the safety features of the protective bumper 10. It is an important feature of the invention, however, that the bumper 16 is not limited in application to new vehicles having bodies of a configuration such as the vehicle 110, but is equally applicable to existing vehicles of a generally rectangular configuration similar to that of the vehicle 10.

In FIG. 7, a modified form of cross-sectional configuration for the bumper 16 is illustrated. A plurality of longitudinally extending vertically spaced reinforcing bars 80 are disposed in the folds of the section 60. It is to be understood that the bars 80 would be placed adjacent each of the sections 58, 60, 62, 64, 66 and 68 as well as adjacent each of the members 30, 32, 44 and 46 and would be rigidly coupled to the same. The bars 80 would provide additional reinforcing to increase the overall strength of the bumper 16.

In FIG. 8, still another modified form of cross-sectional configuration of the bumper 16 is illustrated, it being seen that a vertically disposed panel 82 has a plurality of vertically spaced longitudinally extending U-shaped braces 84 rigidly secured to it, which braces would be disposed intermediate the panel 82 and the vehicle body 14. A plurality of panels 82 with corresponding braces 84 would comprise the sections 58, 60, 62, 66 and 68 and each of the members 30, 32, 44 and 46. It will be appreciated that while only three cross-sectional configurations for the bumper 16 have been illustrated, other configurations will be recognized as applicable by those skilled in the art.

Having thus described the invention, what is claimed as new and desired to be secured by Letters Patent is:

1. A protective bumper adapted to be secured to the frame of a vehicle, said bumper comprising:
   first and second rigidly coupled barrier members presenting a first cuneiform structure;
   means for coupling said structure with the frame forwardly of the vehicle and in fore-and-aft alignment with the latter;
   third and fourth rigidly coupled barrier members presenting a second cuneiform structure,
   each of said first, second, third and fourth members comprising an elongated, generally planar panel of serpentine cross-sectional configuration; and reinforcing means disposed intermediate each pair of members which present a panel, for precluding collapse of one member in the direction of the other member;
   means for coupling said second structure with the frame rearwardly of the vehicle and in fore-and-aft alignment with the latter;
   first and second elongated side guards of serpentine cross-sectional configuration extending between the forward and rearward structures respectively;
   means for coupling said first and second guards with said vehicle on either side of the latter; and
   a plurality of vertically spaced, longitudinally extending reinforcing bars disposed in the folds of said members and said guards, substantially coextensive in length therewith, and coupled with the guards and the members respectively to reinforce the same.

2. The invention of claim 1, wherein a plurality of longitudinally extending, vertically spaced U-shaped braces are disposed intermediate said members and said vehicle, and intermediate said guards and said vehicle.

* * * * *